June 18, 1968  R. W. HOLMES  3,388,885
SWITCH CONSTRUCTION WITH QUICK CONNECTING MOUNTING BRACKET
Filed Feb. 25, 1966  2 Sheets-Sheet 1
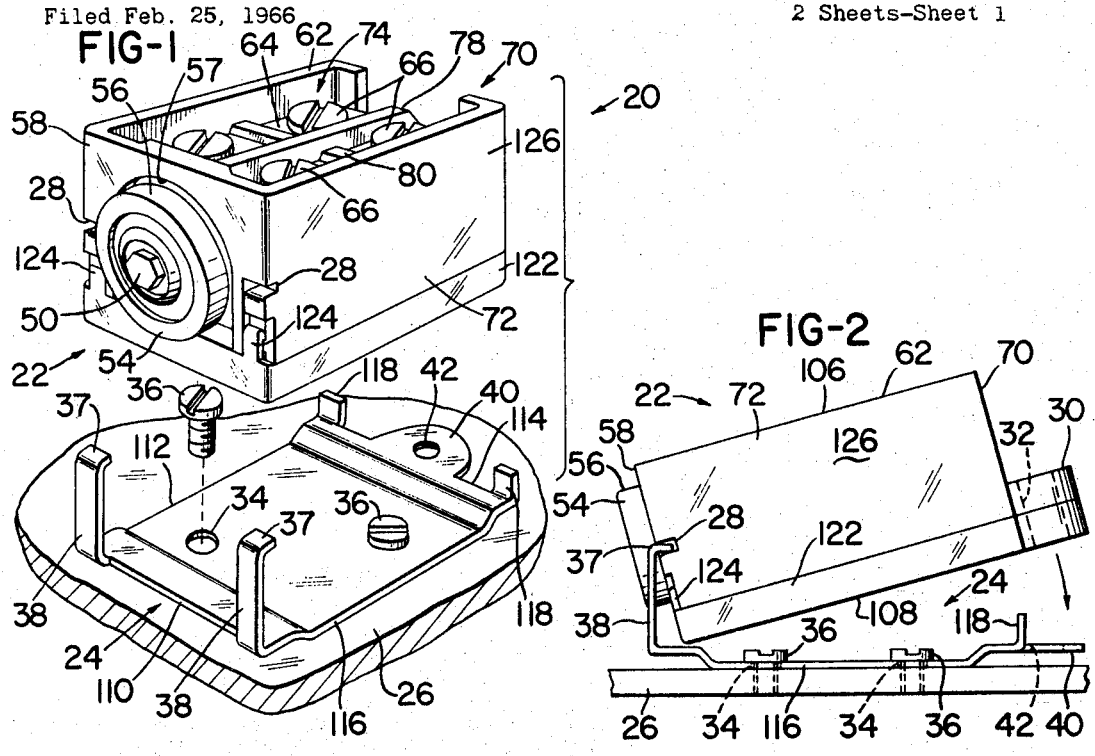
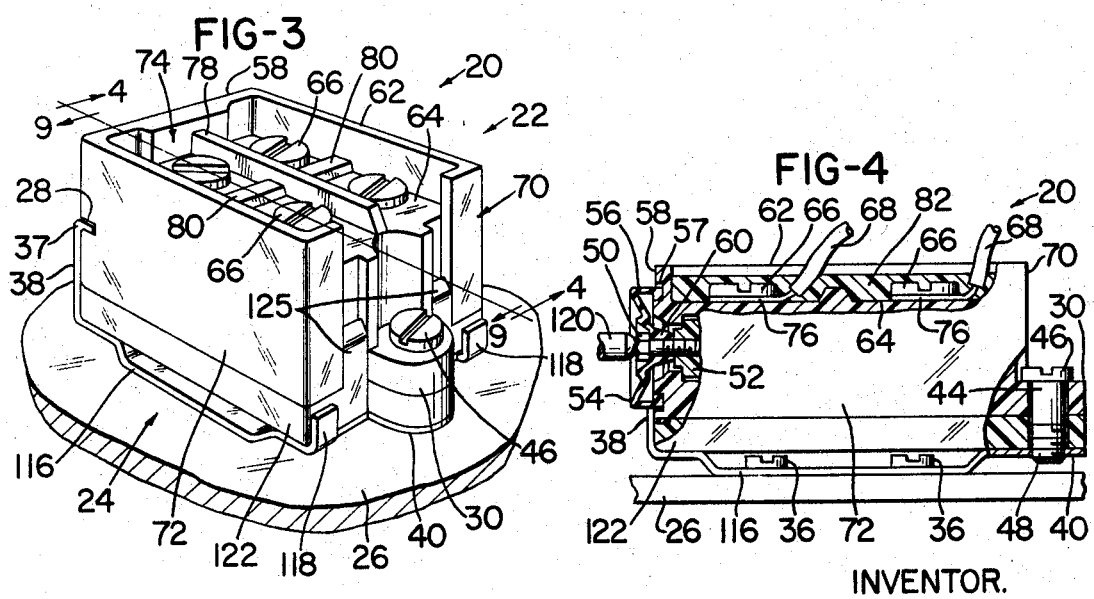
INVENTOR.
RONALD WILLIAM HOLMES
BY
*Cander & Candor*
HIS ATTORNEYS

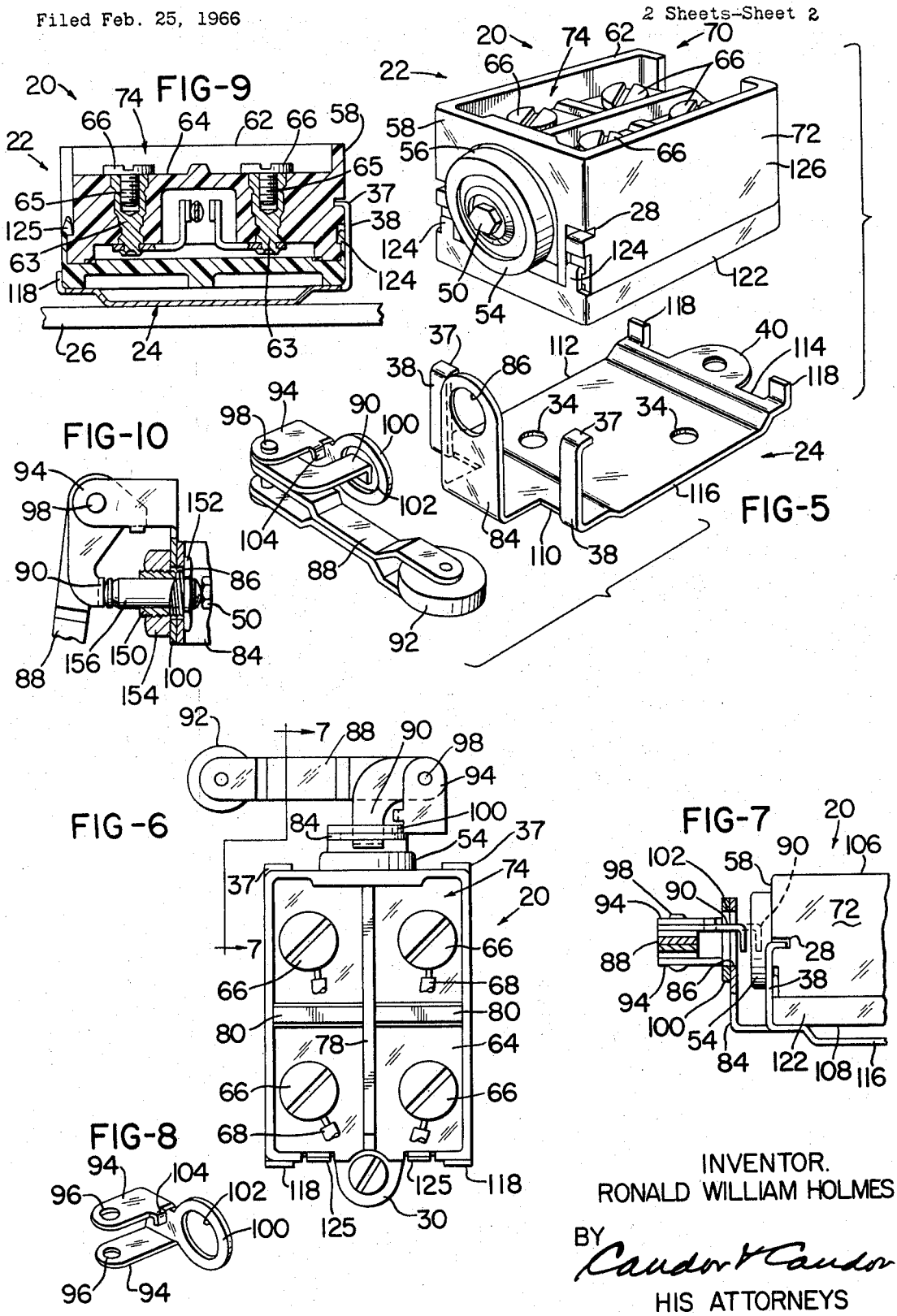

United States Patent Office 3,388,885
Patented June 18, 1968

3,388,885
SWITCH CONSTRUCTION WITH QUICK
CONNECTING MOUNTING BRACKET
Ronald W. Holmes, Columbus, Ohio, assignor to Robertshaw Controls Company, Richmond, Va., a corporation of Delaware
Filed Feb. 25, 1966, Ser. No. 530,010
7 Claims. (Cl. 248—310)

ABSTRACT OF THE DISCLOSURE

A switch construction has a switch casing with a main body with the general shape of a parallelepiped with a casing tongue extending from one side of said parallelepiped, said tongue having a screw receiving hole. The opposite side of the main body has two hook receiving openings. A supporting bracket has the general shape of a rectangle of substantially the same extent as one side of said parallelepiped with two hooks extending from one raised flat edge of said rectangle and hooking into said hook receiving openings. Said bracket also has a bracket tongue extending from the opposite raised flat edge of said rectangle with a threaded screw receiving hole. A casing attaching screw passes through said holes and fastens said casing and bracket together. A central depressed body of said rectangle has one or more bracket attaching screw holes to receive one or more bracket mounting screws with heads between said depressed body and said switch casing.

---

This invention relates to a switch construction with quick mounting bracket means.

A feature of this invention includes a switch construction provided with a quick mounting bracket which may be secured to a support, such as a panel or wall, after which the switch construction may be secured to the bracket quickly and efficiently. A plurality of such brackets and switch constructions may be mounted as a multiple assembly on a panel or wall, or in a sealed or unsealed housing or enclosure. The lead in wires may be fed separately or in a cable, to provide a versatile multiple assembly.

Another feature of this invention includes a switch construction in which a mounting bracket may be secured to a support, with the bracket having hook means extending from the bracket and with fastener receiving means on said bracket spaced from said hook means. The switch construction may have a switch casing with a hook receiving portion and with a casing fastener receiving portion spaced from the hook receiving portion. The construction is such that the switch casing may first be secured to the hook means of the bracket, and the casing can then be pivoted, to align the fastener receiving portions of the bracket and of the casing. The casing and bracket then may be secured together by the fastener means in an efficient manner.

Another feature of this invention includes a construction in which the switch casing may be sealed at the actuating means and at the connector line connecting means, to prevent atmospheric travel into the switch in the casing.

Another feature of this invention includes lever supporting means that can be attached to the bracket, in an integral manner, if desired, so that a lever may be mounted on the bracket to actuate the switch that is secured to the bracket.

Other features of this invention are apparent from this description, the appended claimed subject matter, and/or the accompanying drawings in which:

FIGURE 1 is an exploded perspective view of the switch casing and bracket, in spaced relationship.

FIGURE 2 is a diagrammatic representation of the action taking place when the switch casing is hooked to the bracket, and is being pivoted to fully mounted position.

FIGURE 3 is a perspective view of the switch construction in fully assembled condition, after the pivoting action of FIGURE 2.

FIGURE 4 is a diagrammatic cross-section, partly in elevation, of the switch construction shown in FIGURE 3.

FIGURE 5 is a diagrammatic perspective view of another embodiment of this invention.

FIGURE 6 is a top view of the switch construction of FIGURE 5, in fully assembled condition.

FIGURE 7 is a diagrammatic view, partly in cross-section and partly in elevation, taken along the line 7—7 of FIGURE 6.

FIGURE 8 is a diagrammatic perspective view of the lever supporting construction shown in FIGURE 5, with the lever construction being removed.

FIGURE 9 is a cross-section taken along the line 9—9 of FIGURE 3.

FIGURE 10 shows another embodiment of the lever construction of FIGURE 5.

A switch construction 20, according to this invention, may have a casing 22 and a bracket 24. The bracket 24 may be first secured to a support such as a wall or panel 26, and thereafter the casing 22 may be secured to the bracket 24 in a manner to become apparent.

The casing 22 may be provided with a casing hook receiving portion which may include the openings or opening means 28, which may have the form of slots to receive the hooks to be described. The openings or slots 28 may be adjacent two corners of the casing, on one of its side walls, 58. The casing may also be provided with a casing fastener receiving portion 30, which may take the form of a tongue extension with a screw receiving opening 32. The tongue 30 may be semicircular in plan view, and may be on the side 70 of the casing 20 which is opposite the casing side 58. The bracket 24 may have support securing means including screw holes 34, which may receive screws 36, which may be screwed to support 26. The bracket 24 therefore can be secured to the panel 26 by the screws 36 and thereafter the switch casing can be attached to the bracket 24. The bracket 24 may be provided with hook means which may take the form of two hooks 38 which engage the hook receiving portions or openings 28 of the casing 20. The hooks 38 may have hooked ends 37 which may be inserted in such openings 28. Therefore the casing 22 is pivoted cooperatively to locate the casing fastener receiving tongue 30 with the bracket fastener receiving portion 40, which may take the form of a tongue with a screw receiving threaded opening 42.

The pivoting action is shown in FIGURE 2, and is of such a construction that the screw receiving holes 32 and 42 are aligned or cooperatively located with respect to each other so that a fastener or screw 44 may be inserted in the two tongues 30 and 40, to secure the casing 20 and bracket 24 together. The screw 44 may have a head 46 to engage the tongue 30, and may have a threaded portion 48, threadedly to engage the opening 42 at the tongue 40.

A switch, not shown, of any suitable character, may be located inside of the casing 20, and may have a switch actuator 50, which may be reciprocable inward and outward of the casing 20, to actuate the switch. The switch may have one or more contact constructions which may be opened and closed by the movement of the actuator 50.

For example, the switch in casing 20 may be of the type disclosed in the U.S. patent application of Werner Robert Bauer, Ser. No. 493,108, filed Oct. 5, 1965 for Sealed Limit Switch and the Like, now Patent No. 3,317,697, patented May 2, 1967. The switch in the casing 22 may have a reciprocable plunger 52, in which the actuator 50 may be secured. The actuator 50 may be in the form of a screw which may be threaded into the plunger 52, and has a head 50 located outside of the casing 22.

The actuator 50 may be sealed with respect to the casing 22 by means of a flexible diaphragm or bellows 54, which may be of rubber-like construction. It may have a rim 56, which has an inward bead which is sealingly received in an opening 57 in the side 58 of the casing 22. The diaphragm may have an inner or central opening forming flange 60. The flange 60 may be secured between the head 50 of the actuator and the plunger 52 to provide a substantially hermetic seal between the actuator 50 and the casing 22 where the actuator 50 passes through the casing 22.

Another side 62 of the casing 22 may have a recessed wall 64, FIGURES 4 and 9, which receives screw receiving sleeves 63 which extend into the casing 22 and which can be connected to various parts of the switch inside of the casing in a hermetically sealed manner. The screw connectors 65 have connector fastening screw heads 66. Only the heads 66 of the connectors are visible in the drawing. The screw heads 66 are for the purpose of electrically connecting the terminal lines 68 with the proper parts of the switch. The side or edge 62 and the sides or edges 58 and 70 and the side 72 form a connector cavity 74 in which the connector screw heads 66 may be located. The terminal ends 76 of the terminals 68 may be locked between the connector heads 66 and the sunken or recessed wall 64.

The cavity 74 may have ridges 78 and 80 at right angles to each other, which are located in the cavity 74. These ridges 78 and 80 cooperate with a sealing compound, such as an epoxy adhesive 82, which partially fills the cavity 74, as shown in FIGURE 4. The adhesive 82, seals and covers the connector heads 66 and terminal ends 76 so that no atmospheric travel can take place into the casing 22 along such connections.

In the embodiment shown in FIGURES 5-8, substantially all of the parts are identical with those heretofore disclosed in connection with FIGURES 1-4. Therefore, the same description applies to substantially all of the parts of FIGURES 5-8, and similar reference numerals are used and applied thereto, even if a description is not specifically given concerning such reference numerals in connection with such FIGURES 1-4.

The main difference between the embodiments of FIGURES 5-8 and FIGURES 1-4 is that a lever supporting flange 84 is provided along one side of the bracket 24. The flange 84 has an opening 86 for a purpose to be described.

The lever supporting flange 84 supports a lever 88, which has an axially pushing member 90, which pushes the actuator 50 whenever the lever 88 is rocked back and forth by any suitable cam construction or the like. Such cam construction may rotate and engage the pulley 92 to produce the desired actuations of the switch inside of the casing 22.

The lever 88 and pusher 90 may be supported on a pair of bearing blades 94 which have bearing holes 96, through which a bearing pivot or bolt 98 passes, rockingly to support the lever 88 and pusher 90. The blades 94 may be carried by a ring 100, having an opening 102, to be aligned with the opening 86 of the flange 84. The ring 100 may be secured in any suitable manner to the flange 84, such as by welding or brasing or in such a manner that the pusher member 90 may pass through the openings 102 and 86 and engage the actuator 50 of the switch construction. A suitable stop member 104 may be provided to stop the inward movement of the lever 88 and pusher 90, and thus provide limiting inward movement.

The casing 22 may have a main body with the general shape of a parallelepiped in which the sides 58, 62, 70 and 72, and the top and bottom members 106 and 108 may all be generally rectangular or rectangles in their general shape. Likewise, the bracket 24 may have the general shape of a rectangle, with edges 110, 112, 114 and 116 forming the general edges of the rectangle formed by the bracket heretofore described.

Such bracket rectangle may have a central depressed body between the edges 112 and 116 with two opposite raised flat edges 110 and 114. The depressed body may have at least one bracket mounting screw hole 34 to receive at least one bracket mounting screw 36 to mount the bracket 24 on the support 26. The screw head of the screw 36 is therefore located below, and does not interfere with, the lower surface of the bottom casing member 108.

The casing fastener receiving portion 30, or tongue 30, may extend from one side 70 of the parallelepiped. The hook receiving portion or openings 28 may be on another side 58 of the parallelepiped, which may be opposite from side 70. Thus the casing 22 may be pivoted to align the screw openings 32 and 42 as shown in FIGURE 2. The bracket edges 110, 112, 114 and 116 may have the general shape and the same general extent as the sides 58, 62, 70 and 72 of the casing parallelepiped. The hook means may include two hooks 38, which extend from the edge 110 of the rectangular bracket while the bracket tongue 40 extends from the edge 114 of the bracket 24, in such a manner that the holes 32 and 42 are aligned to receive the screw 44.

The bracket 24 may be provided with two casing aligning flanges 118 on each side of the tongue 40, to engage the casing side 70 in a manner to lock the casing 22 against sidewise movement along the bracket.

Thus it is to be seen that a very convenient construction has been provided. The bracket 24 may be secured to any desired support, such as a panel 26, or the like by means of the screws 36 in a substantially permanent manner. Thereafter the openings 28 of the casing 22 may be placed against the ends 37 of the hooks 38, as shown in FIGURE 2. Then the casing 22 may be pivoted downwardly in FIGURE 2, so that the side 70 is locked against the aligning flanges 118. Thereafter, the screw 44 may be passed through the openings 32 and 42 of the tongues 30 and 40 and threaded into opening 42 to lock the switch casing 22 firmly in place.

The construction is such that a new switch casing 22 may be substituted for the old switch casing merely by disengaging the screw 44, and removing the old casing 22, and its old switch, and placing a new casing 22 and a new switch in lieu thereof. This changing action may be performed either with the embodiment of FIGURES 1-4 and 9, or with the embodiment of FIGURES 5-8. In the embodiment of FIGURES 1-4 and 9, and actuator mover 120 may be provided to move the actuator 50. The mover 120 may be any type of plunger or lever desired which produces an action similar to that of pusher 90 of FIGURE 5.

The casing 22 is shown to have a bottom member 122, which may be hooked by hooks 124 and 125 with the upper part 126 of the casing. The parts 122 and 126 may be secured together in a hermetic and sealing manner, by a suitable means inside of the casing 22, which form no part of this invention, and which is disclosed in connection with the said application and patent of Werner Robert Bauer, to which reference is made, if necessary, for further description thereof.

The ring 100, in FIGURE 5, may be secured to the flange 84 in alignment with opening 86 in any other suitable manner. For example, in FIGURE 10, a suitable threaded sleeve 150 with flange 152 may be passed through the opening 86 and through the ring 100 leftwardly with a nut 154 leftward of the ring 100, holding the end of the threaded sleeve 150. A plunger 156 may pass through the sleeve 150 and press the actuator 50 and be moved by the pusher 90. The pusher 90 does not pass through the ring 100 in FIGURE 10.

It is thus to be seen that a new, useful and unobvious switch construction has been provided.

While the form of the invention now preferred has been disclosed as required by statute, other forms may be used, all coming within the scope of the claimed subject matter which follows.

What is claimed is:

1. In combination: a switch construction having a casing with a casing hook receiving portion and with a casing fastener receiving portion spaced from said hook receiving portion; a bracket having support securing means for securing said bracket to a support and having a bracket fastener receiving portion; hook means on said bracket engaging said casing hook receiving portion and pivoting said casing to cooperatively locate said casing fastener receiving portion with said bracket fastener receiving portion; and a fastener engaging said fastener receiving portions and securing said casing to said bracket, said casing having a main body with the general shape of a parallelepiped with said casing fastener receiving portion forming a casing tongue extending from one side of said parallelepiped with a screw receiving hole, said casing hook receiving portion including two hook receiving openings on one side of said parallelepiped, said bracket having the general shape of a rectangle of substantially the same extent as one side of said parallelepiped, said rectangle having a central depressed body with two opposite flat raised edges, said depressed main body having at least one bracket mounting screw hole to receive at least one mounting screw with a head between said depressed body and said casing, said hook means including two hooks extending from one of said raised edges of said rectangle, said bracket fastener receiving portion including a bracket tongue extending from the other raised edge of said rectangle with a casing attaching screw receiving hole, said hooks pivoting said casing to align said casing attaching screw receiving holes, and a casing attaching screw passing through said holes and securing said casing to said bracket.

2. A combination according to claim 1, said bracket having two casing aligning flanges extending from said other raised edge of said bracket on each side of said tongue to engage a casing side to lock said casing against sidewise movement along said bracket.

3. A combination according to claim 2, said combination having a sealed switch actuator extending out from said casing between said hooks.

4. A combination according to claim 3, said combination having one side of said casing having a connector cavity formed by a recessed wall with switch screw connectors extending into said casing and having terminal line locking screw heads in said cavity.

5. A combination according to claim 4, said combination having terminal lines extending into said cavity with terminal ends locked by said screw heads, and with sealing compound in said cavity sealing said screw heads and terminal ends.

6. A combination according to claim 5, said cavity containing ridges extending from said recessed wall to aid said compound in sealing said screw heads and terminal ends.

7. A combination according to claim 3, said bracket having a lever supporting flange extending from said raised edge of said bracket adjacent said switch actuator to support a lever to move said actuator.

References Cited

UNITED STATES PATENTS

| | | | |
|---|---|---|---|
| 2,647,225 | 7/1953 | Cole et al. | 200—168 XR |
| 3,151,210 | 9/1964 | Hennessey | 174—59 |
| 3,174,078 | 3/1965 | Koenig | 317—120 XR |
| 3,317,697 | 5/1967 | Bauer | 200—168 |

ROY D. FRAZIER, *Primary Examiner.*

J. FRANKLIN FOSS, *Assistant Examiner.*